Dec. 13, 1966   D. L. CORNELIUS ET AL   3,291,883
DYE METERING METHOD FOR INJECTION MOLDING OPERATIONS
Filed Oct. 30, 1963   2 Sheets-Sheet 1

INVENTORS
DAVID L. CORNELIUS,
ALLAN C. DAHLQUIST
BY
*Williamson & Palmatier*
ATTORNEYS INVENTORS
DAVID L. CORNELIUS,
ALLAN C. DAHLQUIST
BY
Williamson & Palmatier
ATTORNEYS

United States Patent Office 3,291,883
Patented Dec. 13, 1966

3,291,883
DYE METERING METHOD FOR INJECTION
MOLDING OPERATIONS
David L. Cornelius, Coon Rapids, and Allan C. Dahlquist, Minneapolis, Minn., assignors, by mesne assignments, to West Bend Thermo-Serv, Inc., Anoka, Minn., a corporation of Minnesota
Filed Oct. 30, 1963, Ser. No. 320,066
4 Claims. (Cl. 264—329)

This invention relates to injection molding machines and more specifically to a method and device operable for metering dry powdered dye material in predetermined amounts into the stream of particulate plastic material being fed into a screw type injection molding machine.

One of the problems associated with plastic molding operations and specifically plastic molding operations wherein the plastic used is of the thermo plastic type, is the problem associated with providing a color for the plastic. Generally speaking, the thermo plastic used in injection molding operations is generally in a dry powdered or particulate form and the dye material to be used is also of the dry powdered type. Suppliers of plastic are capable of supplying colored plastics wherein the suppliers themselves provide the color to the thermo plastic material but this requires the user to maintain relatively large inventories and the pre-colored plastics are more expensive than the uncolored plastics. There are some prior art devices which permit users to mix color or dye material with the powdered plastic material but these conventional coloring operations are quite time consuming and generally involve a tumbling type action wherein the plastic and dye materials are placed in a closed container and are revolved or tumbled to thoroughly admix the same. There are no known mechanisms or devices which are in close combinative relation with conventional screw type injection molding machines and permit effective mixing of the plastic and dye material during operation of the injection molding machine.

A further object of this invention is to provide a method for metering and mixing dry powdered dye material and dry plastic material during an injection molding operation wherein the materials are continuously introduced in unmixed condition into an injection molding machine and are thoroughly admixed therein.

These and other objects and advantages of our invention will more fully appear from the following description made in connection with the accompanying drawings, wherein like character references refer to the same or similar parts throughout the several views, and in which.

Figure 1:
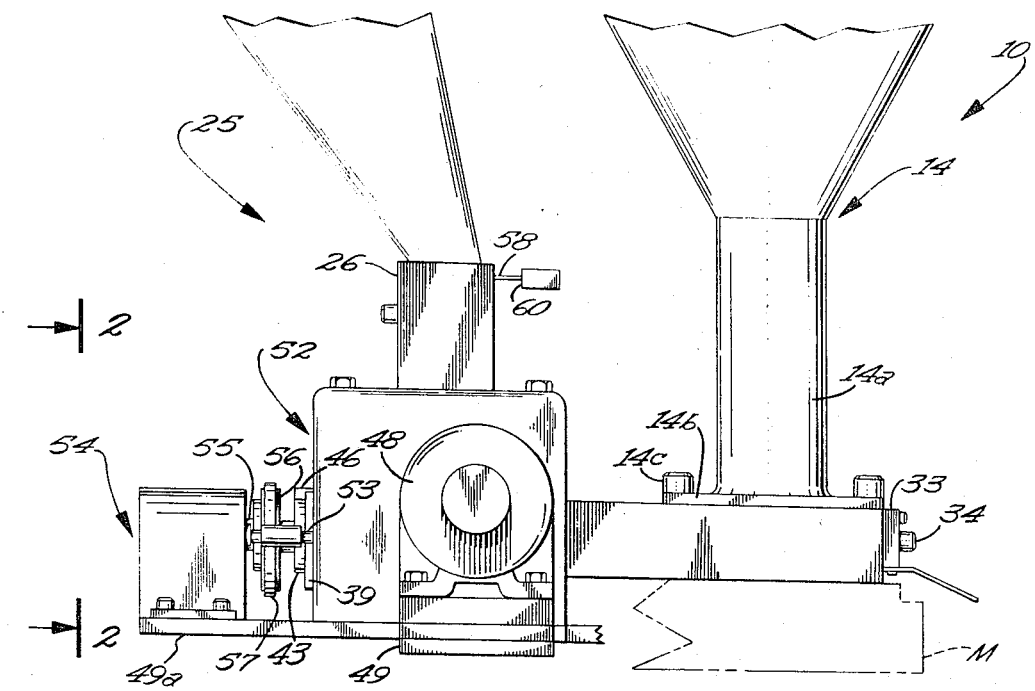
FIG. 1 is a side elevational view of the invention illustrated in mounted relation upon the conventional reciprocating screw type injection molding machine.
Figure 4:
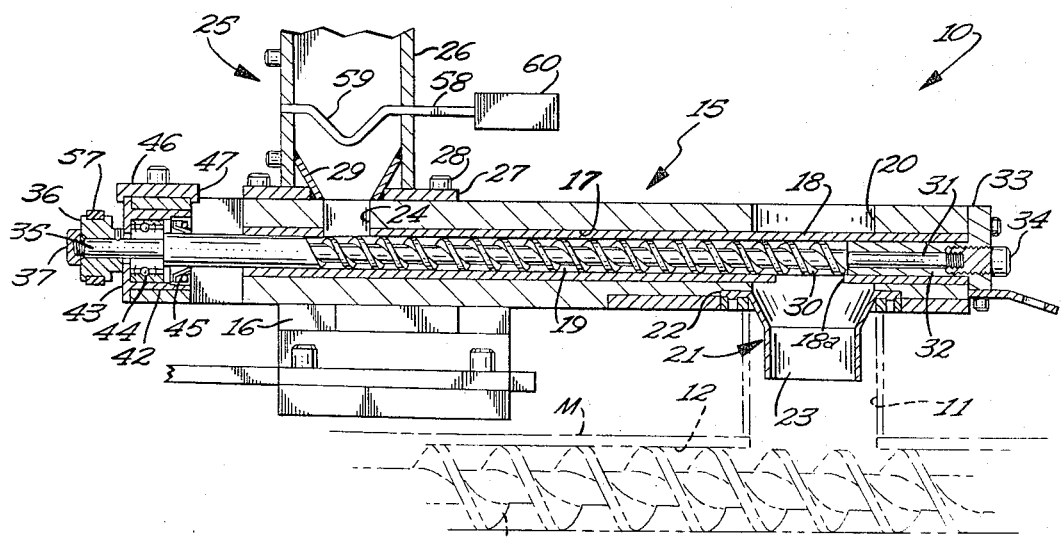
FIG. 4 is a cross sectional view taken approximately along line 4—4 of FIG. 3 and looking in the direction of the arrows.

Referring now to the drawings it will be seen that one embodiment of the dye metering attachment or device, designated generally by the reference numeral 10, is there-shown. This dye metering device 10 is illustrated, as best seen in FIGS. 1 and 4, in mounted relation upon a conventional reciprocating screw type injection molding machine M. This injection molding machine M is provided with an intake passage 11, as best seen in FIG. 4, which is vertically oriented and which communicates with the injection screw chamber 12, the latter having a relatively large reciprocating injection screw 13 disposed therein.

It will be appreciated that during operation of the injection molding machine, dry thermo plastic powdered or particulate plastic material is fed into the inlet passage 11 and into the injection screw chamber 12. The walls defining the injection screw chamber 12 are heated to thereby heat the dry plastic material and the injection screw 13 is shifted axially forwardly and towards the left, as viewed in FIG. 4, during the injection cycle to inject the then liquid plastic into the mold cavity. During axial movement of the injection screw 13 to the rear, the injection screw will be revolved thus causing movement of the plastic material axially and forwardly of the injection screw chamber 12. The dry plastic material is fed into the inlet passage 11 of the injection molding machine M from a conventional hopper structure 14, the latter being vertically oriented and having a vertically disposed neck 15, the lower end of which communicates with the inlet passage 11. It will be seen that the dry particulate or powdered plastic material will be continuously fed through the inlet passage 11 during the molding operation.

The dye metering device 10 comprises an elongate, generally rectangular shaped chamber defining structure 15 formed of a suitable rigid metallic material and detachably mounted upon the upper surface of the injection molding machine M by means of a bracket 16, the latter being releasably secured to the injection molding machine by suitable bolts. It will be seen that the chamber defining structure is horizontally oriented and has an elongate cylindrical passage or bore 17 extending therethrough. It will be seen that the passage or bore 17 is also horizontally disposed and snugly accommodates a metering tube or cylindrical member 18 therein. It will be noted that the metering tube 18 is of substantially the same length as the chamber defining structure 15 and the interior of the metering tube defines an elongate metering chamber 19, as best seen in FIG. 4.

Referring again to FIG. 1 it will be seen that the lower end portion of the hopper neck 14a is provided with an outturned flange 14b which, as seen, is secured by bolts 15c to the upper surface of the chamber defining structure 15. It will also be seen that the chamber defining structure 15 has a vertically opening passage 20 therethrough which is arranged in communicating relation with the interior of the neck and the hopper structure 14.

A material guiding or funneling member 21 is positioned within the lower portion of the passage 20 and projects downwardly into the inlet passage 11 of the molding machine M. It will be seen that the funnel member 21 has an outturned annular flange 22 at its upper end which is secured to the chamber defining structure 15 and also has a substantially cylindrical lower portion 23 which is integrally formed with the frusto-conical portion of the funnel member 21 and which serves to discharge the material directly into the injection screw chamber 12.

Figure 3:
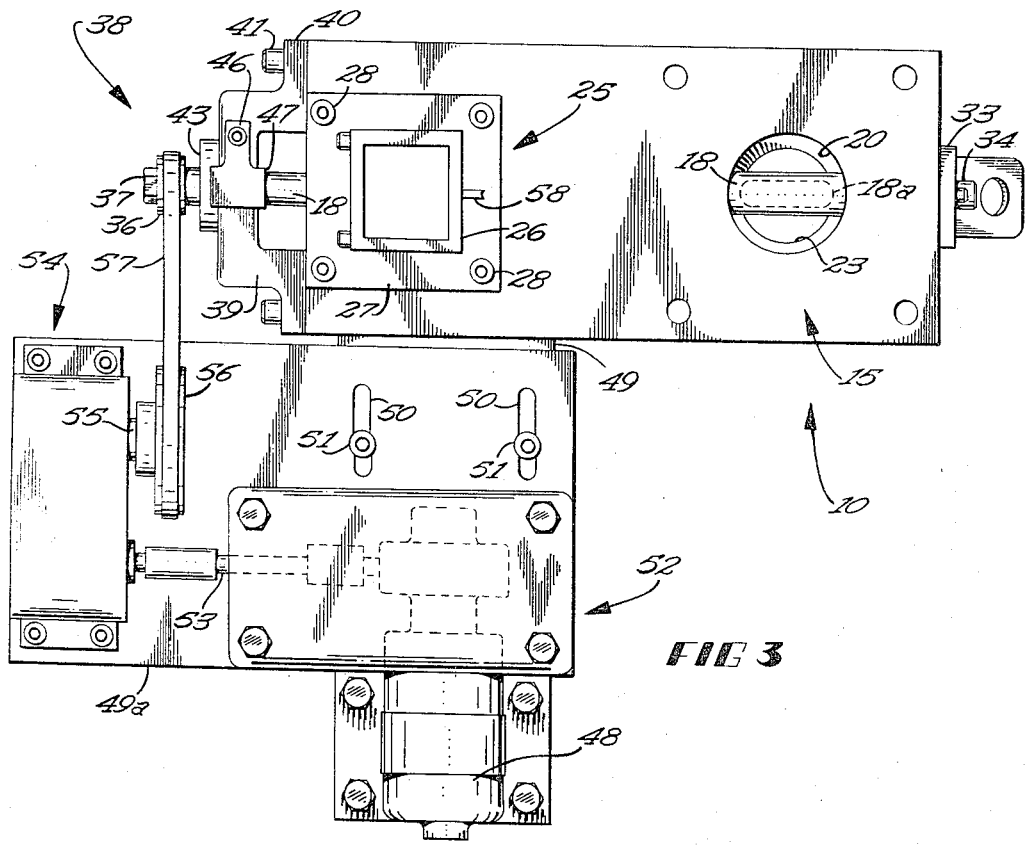
FIG. 3 is a plan view of the invention with certain concealed parts thereof illustrated by dotted line configuration.

It will be noted that the chamber defining structure 15 and the metering tube 18 have upwardly facing registering openings therein which define an inlet passage 24 communicating with the interior of the metering tube 18. A hopper or receptacle 25 is mounted upon the chamber defining structure 15 and this hopper 25 is adapted to contain a supply of powdered or particulate dried dye material therein. The hopper 25 includes a neck 26 which is secured at its lower end to a substantially flat mounting plate 27 which in turn is detachably connected to the chamber defining structure 15 by conventional bolts 28, as best seen in FIGS. 3 and 4. Referring again to FIG. 4, it will be seen that the neck 26 is provided at its lower end with downwardly converging guide plates 29, the latter having their lower ends terminating adjacent the upper end of the inlet passage 24. Thus it will be seen that dye material from the hopper 25 may be fed by action of gravity directly into the interior of the metering tube 18.

Means are also provided for conveying dye material discharged through the inlet passage into the metering tube 18 to the opposite end for discharge into the inlet passage 11 of the injection molding machine. This means comprises a metering screw 30 which is mounted for revolving movement within the metering tube. It will be seen that the metering screw 30 when revolved will quickly convey the material axially through the metering tube towards the discharge end thereof. One end of the metering tube is reduced as at 31 and this reduced end is positioned within a sleeve bearing 32 which, as seen in FIG. 4, is provided with an outturned annular flange 33, the latter being secured by suitable bolt means to the end of the chamber defining structure 15. It will be seen that the reduced end 31 of the metering screw 30 has an enlarged retaining element 34 secured thereto for rotation therewith to prevent axial displacement of the screw relative to the sleeve bearing 32.

Figure 2:
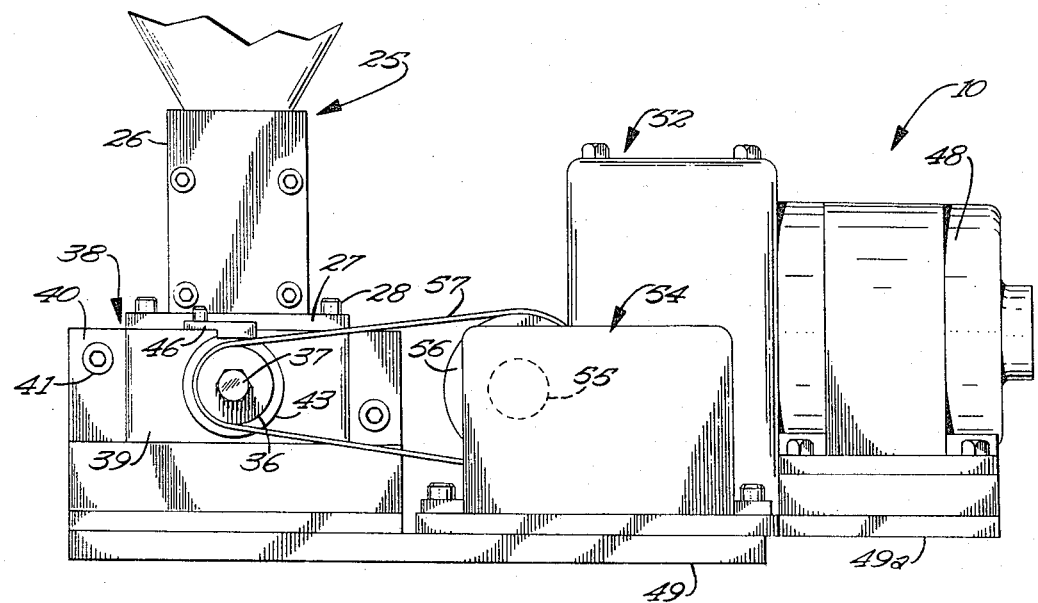
FIG. 2 is an end elevational view thereof as viewed along line 2—2 of FIG. 1 and looking in the direction of the arrows.

The other end portion of the metering screw 30 is also reduced as at 35 and it will be seen that this reduced end portion 35 projects exteriorly of the chamber defining structure 15. A driven pulley 36 is secured to the reduced end portion 35 of the metering screw 30 by a suitable securing nut 37 and it is pointed out that the pulley 36 is keyed to the metering screw for rotation therewith. A bearing assembly is also provided for revolvably supporting the driven end of the metering screw 30 and this bearing assembly includes a bearing housing 38 which is of generally rectangular configuration, as best seen in FIGS. 2, 3 and 4, the housing having a pair of leg portions 39 which terminate in outturned attachment elements 40, which are suitably apertured and which are provided with bolt assemblies 41 for attachment to the chamber defining structure 15. It will be seen that the driven end of the metering screw 30 projects through the housing 38 and that a sleeve member 42 is positioned concentrically around the end of the metering screw and within the bearing housing 38. The sleeve member 42 has an annular end plate 43 integrally formed therewith and this end plate is suitably apertured to accommodate the reduced end portion 35 of the metering screw 30. It will be noted that this end plate 43 is positioned exteriorly of the bearing housing 38 and is interposed between the pulley 36 and the end of the housing 38. A ball bearing member 44 is interposed concentrically between the sleeve member 42 and the reduced end portion 35 of the metering screw 30, as best seen in FIG. 4. A thrust bearing member 45 is also positioned within the sleeve member 42, the bearing 44 and thrust bearing 45 being of conventional construction. A clamping plate 46 is positioned upon the housing 38 and this clamping plate 46 has depending flanges or lips 47 which engage the edge of the housing 38 and the end plate 43, to retain the sleeve member 42 in mounted relation within the bearing housing 38. A suitable bolt releasably retains the clamp 46 in mounted relation upon the bearing housing 38.

Referring again to FIG. 4, it will be seen that the metering tube 18 has a downwardly facing discharge outlet 18a therein which intercommunicates the interior of the metering tube with the funnel member 21. It will therefore be seen that when the metering screw 30 is driven, dye material received from the dye hopper 25 will be conveyed through the metering tube and will be discharged into the inlet passage 11 and thereafter into the injection screw chamber 12.

Means are also provided for driving the metering screw 30 and it will be seen that to this end a conventional electric motor 48 is provided and is mounted by means of a mounting plate 49a upon a base plate 49 of the injection molding machine M. Referring now to FIG. 2, it will be seen that the mounting plate 49a is positioned in close proximity to the chamber defining structure 15 and it will also be noted that the mounting plate 49a is provided with a pair of elongate slots 50 through which project bolt assemblies 51, the latter engaging the base plate 49. The base plate is mounted upon the injection molding machine M and also supports the chamber defining structure 15.

With this arrangement the mounting plate 49a may be shifted towards and away from the chamber defining structure, the purpose of which will be more clearly defined hereinbelow.

The electric motor 48 is of conventional construction and is provided with a suitable output shaft which is connected to an electrically actuated clutch mechanism 52, as best seen in FIG. 2. The circuit for actuating the clutch mechanism 52 also includes the actuating mechanism for the clutch means for the injection screw 13 of the injection molding machine. This clutch mechanism 52 is connected to a drive shaft 53 which is drivingly connected to a variable speed mechanism 54, sold in the trade under the trademark "Varidrive" and manufactured by Zero-Max Industries Inc. This variable speed mechanism 54 is provided with an output shaft 55 having a drive pulley 56 keyed thereto for rotation therewith. An endless belt 57 is trained around the drive pulley 56 and the driven pulley 36 whereby when the motor 48 is energized and the clutch mechanism is actuated to interrelate the output shaft of the motor with the drive shaft 53, the metering screw 30 will be driven thereby permitting the dye material to be discharged into the injection molding machine M.

It will also be seen that the drive belt 57 may be tightened or loosened by shifting the mounting plate 49 relative to the chamber defining structure 15.

Since the dye material within the hopper 25 is of dry particulate or powdered form, means are provided to prevent bridging of the material in the neck 26 of the hopper. To this end, it will be seen that a revolvable anti-bridge member 58 projects through the neck 26, this bridge member having a generally off-set U-shaped central portion 59, as best seen in FIG. 4. A coupling element 60 is secured to one end of the anti-bridge member and is arranged and constructed for connection to the drive shaft of a conventional motor whereby the anti-bridge element 58 may be driven. It will therefore be seen that when the anti-bridge element 58 is revolved, the material within the neck portion 26 of the hopper will be agitated and will be prevented from bridging and will therefore allow the material to fall by action of gravity through the inlet passage and into the metering tube 18.

During operation of the dye metering device 10, the hopper structure 14 will be filled with a suitable uncolored or clear preferably thermo plastic material, the plastic material being in substantially dry powdered form. The dye hopper 25 will be provided with the particulate dye material selected to dye the plastic and this dye material will also be in dry powdered form. The injection molding machine M will be energized and the clutch for actuating the reciprocating injection screw 12 will also be energized, which operation simultaneously actuates the clutch mechanism 52 for the dye metering attachment 10. The drive shaft 53 will be revolved and the output shaft 55 will also be driven at a predetermined speed to thereby revolve the metering screw 30. The variable speed drive mechanism 54 is variously adjustable and the particular speed at which the output shaft 55 is driven will be dependent upon the particular dye material used and the specific shade and intensity of the color desired.

If motor means are provided for the anti-bridge member 58, this motor means will also be energized whereby the anti-bridge member will be driven to permit smooth flow of the powdered dye material into the metering tube 18. It will be seen that as the metering screw 30 is revolved, the dye material will be conveyed through the metering tube and will be discharged through the outlet 18a and into and through the funneling member 21. The plastic material within the hopper structure 14 will also be continuously discharged through the passage 20 and into the funnel member 21 so that the streams of plastic and dye material being introduced into the injection molding machine M will be co-mingled in the funneling member 21 and in the inlet passage 11. It will also be noted, as best seen in FIG. 3, that the passage 20 is substantially larger than the metering tube 18 and it will be seen that the metering tube extends substantially diametrically through the passage 20. Thus the plastic material will be discharged on opposite sides of the stream of dry dye material discharged through the discharge outlet 18a in the metering tube.

As the dye material and plastic material are received within the injection screw chamber 12, the material will be thoroughly mixed and heated. As pointed out above, the injection screw chamber 12 is heated so that the plastic and dye materials will be continuously heated as this material is moved through the injection screw chamber. The injection screw 13 moves the heated plastic and dye material axially through the chamber 12 in a forward direction or to the left as viewed in FIG. 4, by axial movement of the screw. The screw 13 is reciprocated in a fore-and-aft direction and does not revolve during the forward stroke thereof but does revolve during the return or rearward stroke thereof. Thus, the dye and plastic materials will be continuously and thoroughly admixed and heated by action of the injection screw 13 in the injection screw chamber 12.

It will therefore be seen that the entire coloring or dying operation for the plastic is accomplished during operation of the injection molding machine and obviates the necessity of premixing the dye material with the plastic material. Since the discharge opening 20 through which the plastic material is fed into the injection screw chamber 12 is of fixed size, it will be seen that the quantity of plastic material being supplied into the injection screw machine is substantially constant. However, because of the adjustability of the variable speed drive mechanism 54, the speed of the metering screw 30 may be readily varied and the amount of material being supplied to the injection screw chamber may be readily varied. Thus the amount of dye material with respect to the plastic material may be readily predetermined.

It will therefore be seen that the material injected into the mold cavities by the injection screw 13 may be very accurately dyed through the use of the dye metering device 10.

It is also pointed out that when the drive to the injection screw 13 is disengaged therefrom the clutch mechanism 52 will also be disengaged from driving relation with respect to the shaft 53, whereby the metering screw will be rendered inoperative.

From the foregoing it will be seen that we have provided a unique and novel dye metering method and device for use with a reciprocating type injection molding machine and in which a continuous supply in desired predetermined amounts of dry dye material is fed into the inflowing stream of dry plastic as the plastic material is being fed into the injection molding machine so that the necessity of pre-mixing the dye material with the plastic material is obviated.

It will also be seen that the dye metering device described in the preceding paragraphs is operable to permit a high degree of quality controls with respect to the plastic being colored or dyed.

Thus it will be seen that the dye metering device is not only of simple and inexpensive construction, but functions in a more efficient manner than any heretofore known comparable device.

It will, of course, be understood that various changes may be made in the form, details, arrangement and proportions of the various parts without departing from the scope of the invention.

What is claimed is:

1. A continuous method of metering and mixing dry powdered dye material and plastic material during an injection molding operation, said method comprising the steps of continuously moving a stream of dry plastic material by action of gravity through a vertical course of travel, continuously introducing dry powdered dye material by action of gravity into a substantially closed horizontal metering chamber and continuously moving said dry powder in a horizontal stream through the metering chamber by a revolvable variable speed metering medium, continuously discharging a stream of powdered dye material having a predetermined volume flow from the medium chamber by action of gravity directly into the vertically moving stream of plastic material, controlling the volume flow of the stream of powdered dye material by the rotational speed of the metering medium, continuing movement of the stream of plastic and dye materials in a vertical course of travel and passing said materials through a restricted zone to cause admixing of the plastic and dye materials, continuing movement of the stream of mixed material and introducing the mixture only into a horizontally disposed heating and mixing chamber, and further mixing said mixed materials and simultaneously heating the same to a fluid condition by a revolvable heating and mixing medium while moving the stream of mixed materials through a horizontal course of travel.

2. The method as defined in claim 1 wherein revolving movement of the metering medium and discharge of the stream of dye material from the metering chamber is in response to revolving movement of the heating and mixing medium.

3. The process as defined in claim 1 wherein said plastic material comprises a thermoplastic material.

4. The process as defined in claim 1 wherein a horizontal course of travel of the mixture of plastic and dye materials through the heating and mixing chamber is in an opposite direction with respect to the horizontal direction of travel of the dye material through the metering chamber.

References Cited by the Examiner

UNITED STATES PATENTS

| 2,382,655 | 8/1945 | Nichols. | |
|---|---|---|---|
| 2,952,041 | 9/1960 | Bernhardt | 264—329 |
| 3,002,229 | 10/1961 | Freiderich | 264—329 |
| 3,123,864 | 3/1964 | MacIntyre. | |
| 3,148,412 | 9/1964 | Spreeuwers. | |
| 3,158,905 | 12/1964 | Havlik. | |
| 3,164,860 | 1/1965 | Oxel. | |

FOREIGN PATENTS 13,778   12/1962   Japan.

ROBERT F. WHITE, *Primary Examiner.*

R. B. MOFFITT, *Assistant Examiner.*